Aug. 18, 1936.  R. J. WATERWORTH  2,051,280
WRINGER
Filed Oct. 30, 1934  6 Sheets-Sheet 6

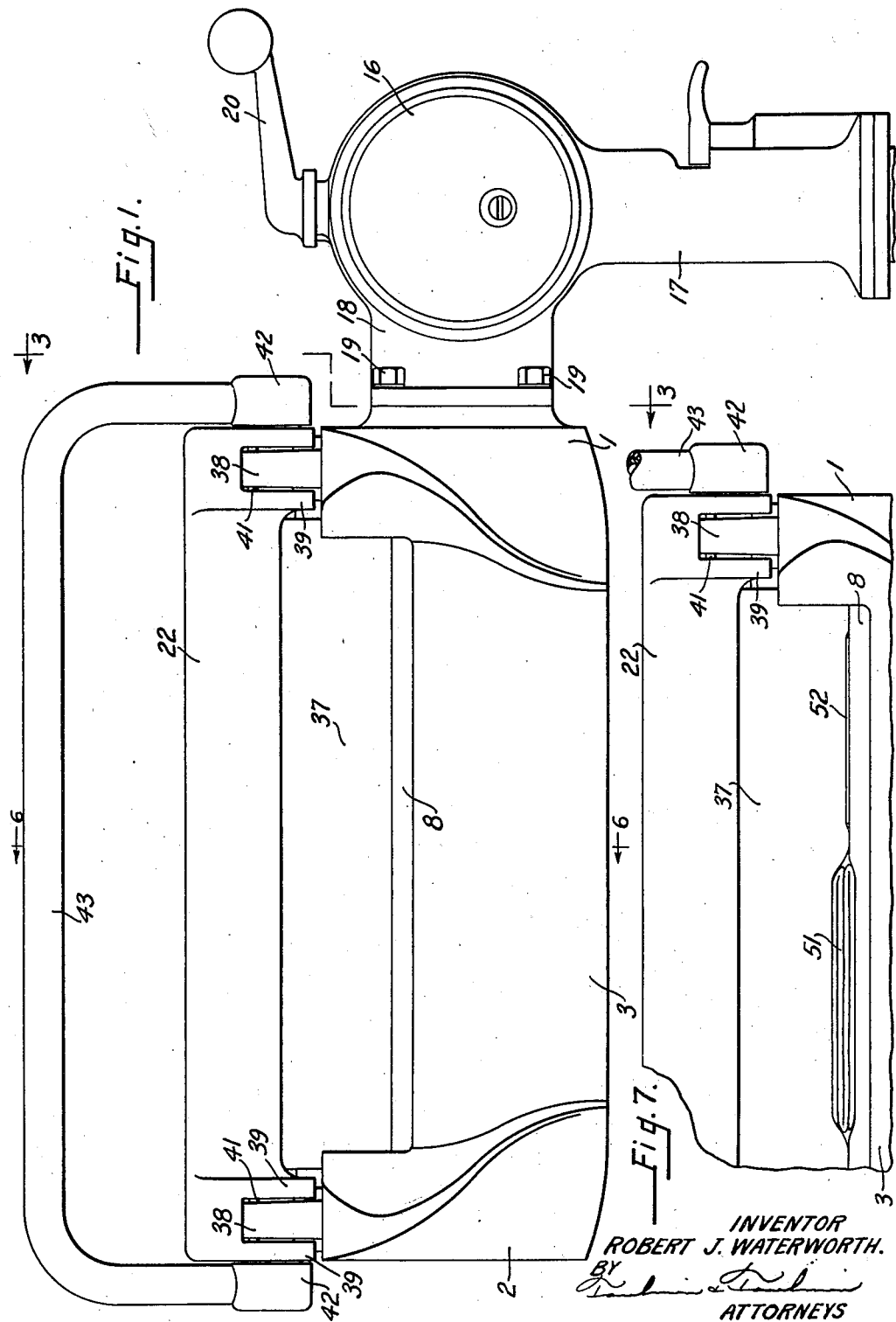

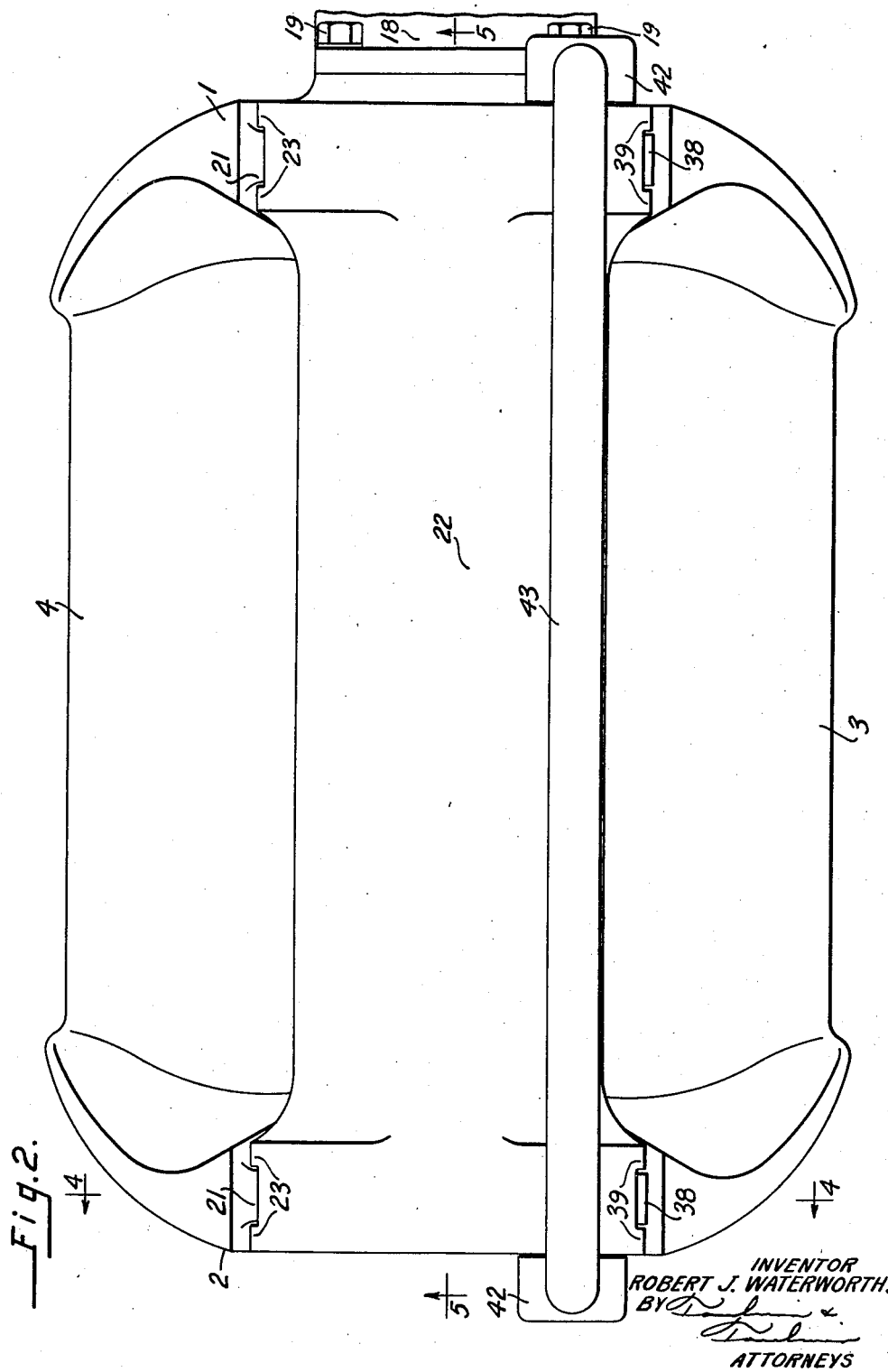

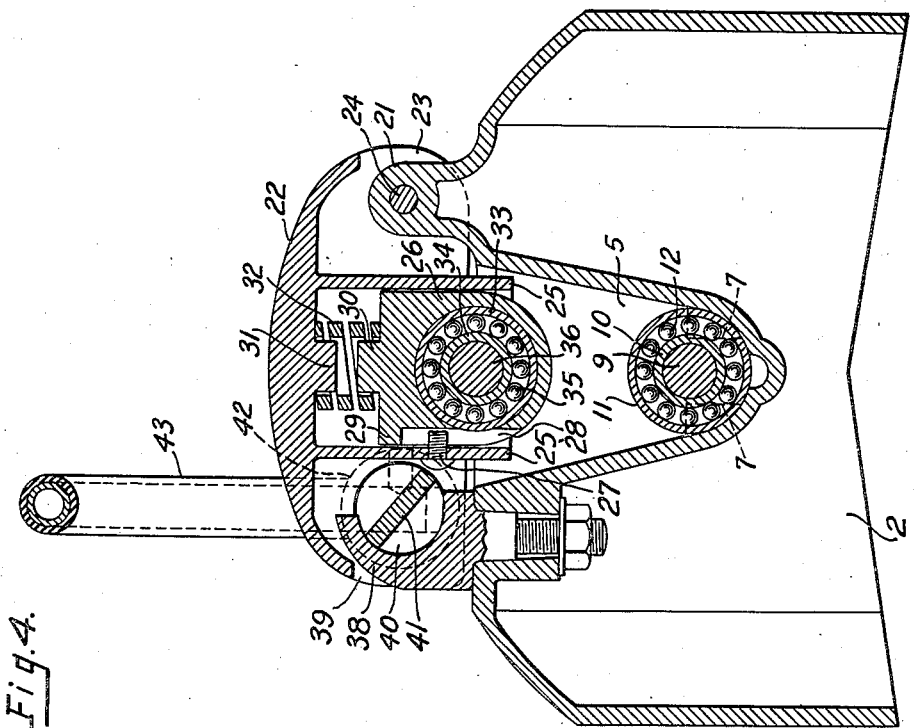
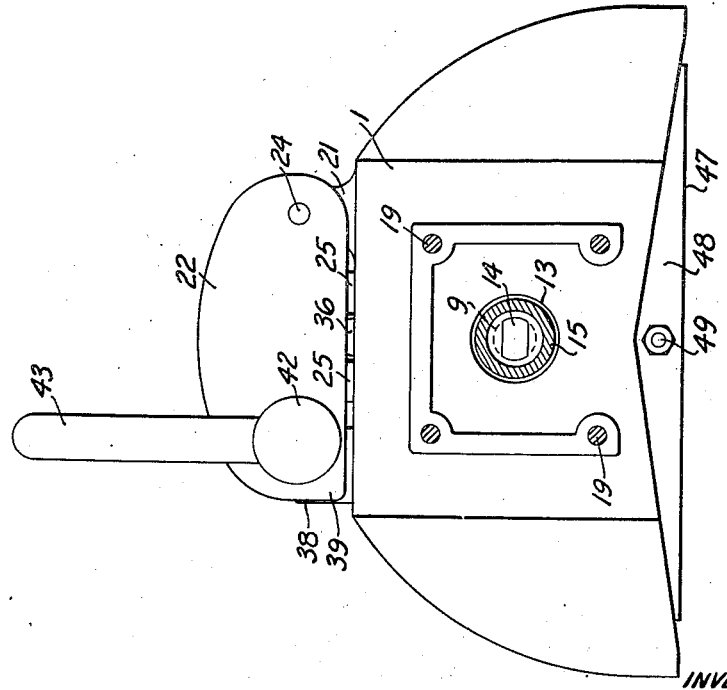

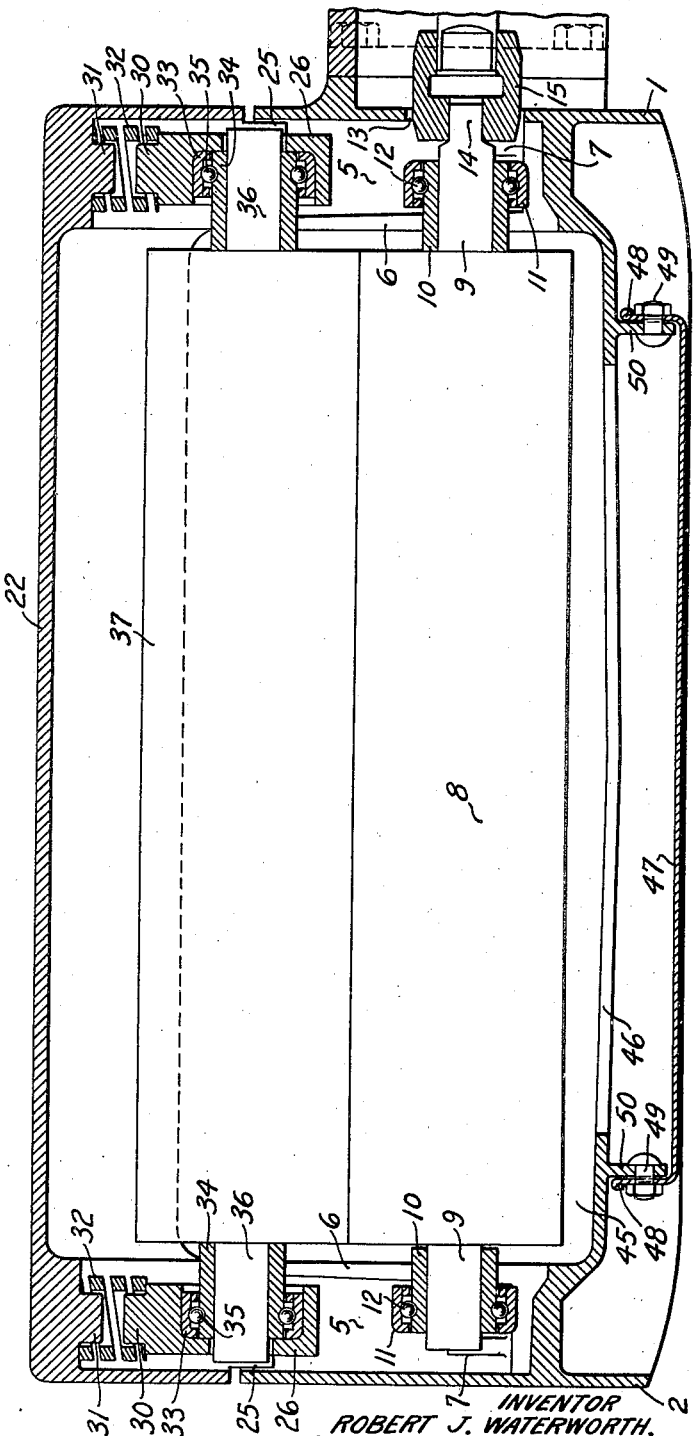

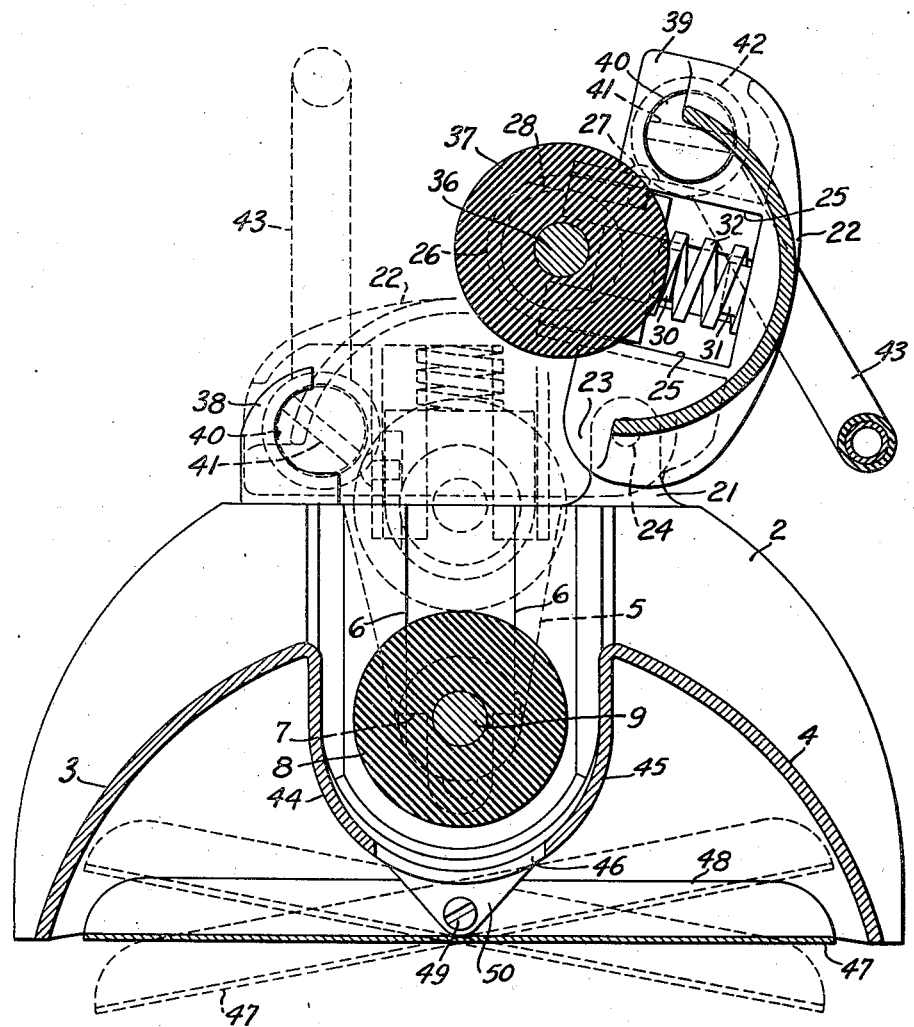

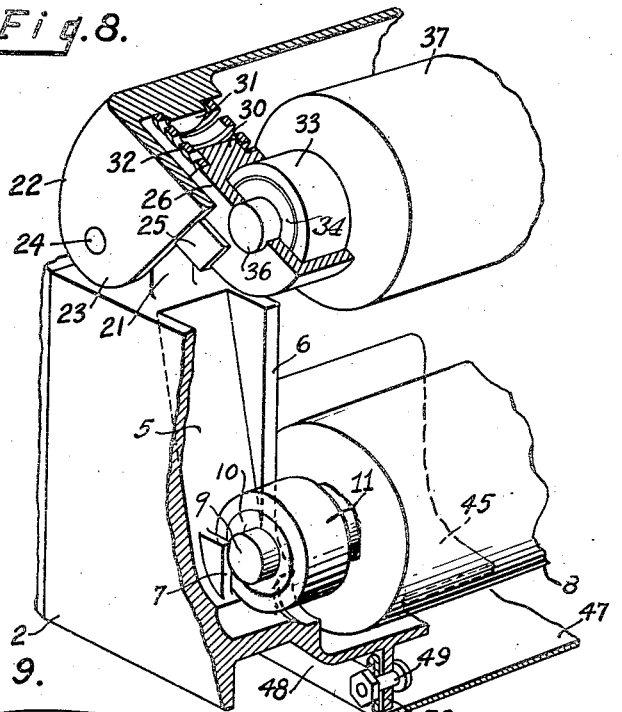

Fig. 8.

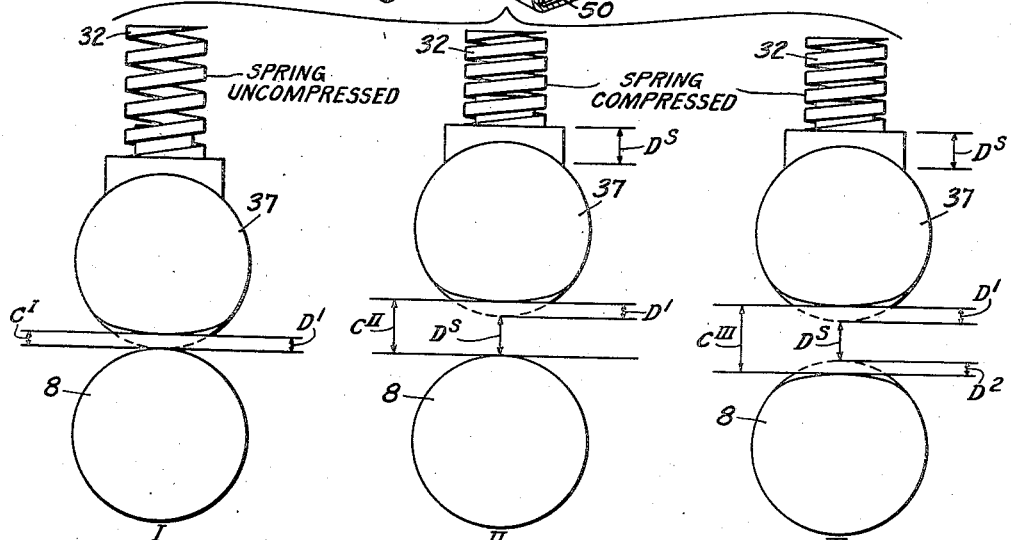

Fig. 9.

I
THIN WORK
SOFT ROLL 37 DISTORTED
SPRING UNCOMPRESSED
LIGHT PRESSURE
$C^I$ = CLEARANCE, THIN WORK
$D^I$ = DISTORTION, SOFT ROLL 37
$C^I = D^I$.

II
MEDIUM WORK
SOFT ROLL 37 DISTORTED
SPRING COMPRESSED
MEDIUM PRESSURE
$C^{II}$ = CLEARANCE, MEDIUM WORK
$D^S$ = DISTORTION, SPRING 32
$C^{II} = D^I + D^S$.

III
THICK WORK
SOFT ROLL 37 DISTORTED
SPRING COMPRESSED
HARDER ROLL 8 DISTORTED
$C^{III}$ = CLEARANCE, THICK WORK
$D^2$ = DISTORTION, HARDER ROLL 8
$C^{III} = D^I + D^S + D^2$.

INVENTOR
BY ROBERT J. WATERWORTH.
ATTORNEYS

Patented Aug. 18, 1936

2,051,280

UNITED STATES PATENT OFFICE 2,051,280

WRINGER

Robert J. Waterworth, Sidney, Ohio, assignor to Prima Mfg. Company, Inc., Sidney, Ohio, a corporation of Ohio Application October 30, 1934, Serial No. 750,653

7 Claims. (Cl. 68—32)

This invention relates to improvements in wringers, and has for its object to provide a "never-crush" wringer, in which the deformation of a rubber roll cooperates with springs for producing an efficiently operating wringer. By the use of a combination consisting of a rubber roll and springs the necessity for adjustment for different thicknesses of garments is eliminated.

In order to provide a suitable cooperation between the rubber roll and the springs a spring medium had to be found which would sufficiently distort the upper or soft roll so as to allow sufficient wringing of thin garments and yet at the same time properly wring heavy garments without stalling the motor or injuring the mechanism.

A suitable spring for this purpose has been developed which has a compression, ratio between the compression ratios of the soft rubber roll and a roll formed of a harder rubber, with the result that the soft roll will deform under lighter pressures and give a sufficient wringing to thin garments, while in the case of heavy garments and an increased pressure the springs become compressed and allow a heavy wringing to be accomplished without injury to the mechanism.

It is also an object of this invention to provide a simple, efficient and attractive wringer composed of a base, a top pivotally mounted on the base, and a latch for holding the top securely to the base, and so constructed that it can be released by a forward or rearward movement of the hand of the operator in engagement with the release instrumentality. The rolls are locked in operating positions without the necessity of any readjustment of the spring tension for the rolls. This release instrumentality secures against accident in the operation of the wringer.

These and other advantages will appear from the following description taken in connection with the drawings.

Referring to the drawings:—

Figure 1 is a front elevation of the wringer.

Figure 2 is a top plan view of the wringer.

Figure 3 is a section on the line 3—3 of Figure 1.

Figure 4 is a section on the line 4—4 of Figure 2.

Figure 5 is a section on the line 5—5 of Figure 2.

Figure 6 is a section on the line 6—6 of Figure 1, with the top raised.

Figure 7 is a view showing the deformations of the rolls while wringing a heavy garment and a light piece of goods.

Figure 8 is a fragmentary perspective view of the details of the roll mountings, partly in section, with the lower roll and bearing assembly shown in dotted lines for the purpose of clearness.

Figure 9 is an exaggerated diagrammatic view showing the position and conditions of the hard roll, the soft roll and the springs when the materials of various thicknesses are introduced between the rolls of the wringer.

The present wringer is composed of two essential supporting parts, a base and a top. The base is composed of an end 1, an end 2, a front 3 and a rear 4 (Figures 1 and 2). The front and rear serve to connect the ends and form a supporting structure for all operating parts, including the top. The base and the top mounted thereon are constructed to give a streamline effect so that very limited opportunity is given for the collection of dust, dirt and other foreign material.

In each end there is a pocket 5 (Figures 5, 6, and 8). Each end has thereon, around the pocket and at one edge thereof, a U-shaped flange 6 which serves to support parts of bearing members. In each pocket there are two spaced lugs 7, the edges of which are substantially in alignment with the edges of the flanges 6. The base carries a lower roll 8, which is made of harder rubber than an upper cooperating roll and has the usual shaft 9.

On each end of the shaft 9 is a sleeve 10, which is loosely mounted thereon and forms one part of a bearing member. This bearing member comprises the aforesaid sleeve 10, the exterior bearing ring 11, and balls 12 interposed therebetween. The bearing ring 11 is adapted to be supported in the bottom of the pocket formed between the U-shaped flanges 6 and end walls 2 (Figures 4, 8) and is held against axial or longitudinal movement therein by the lugs 7, between which lugs 7 and the flanges 6, the bearing ring 11 fits. The lugs and the flanges prevent any movement of the sleeve and the balls longitudinally with relation to the shaft.

The end 1 has therein a hole 13 through which a properly shaped end 14 of the shaft 9 projects for receiving a coupling 15 (Figure 5). This coupling 15 is used for the purpose of connecting the shaft to transmission mechanism located within a transmission housing 16 supported by means of a support 17 (Figure 1). The transmission housing is connected to the end 1 by means of a connection 18 and bolts 19. For the purpose of shifting the transmission mechanism located within the transmission housing there is properly supported on the housing a lever 20, which may be used for connecting the gears within the housing for operating the wringer in either of two directions.

On top of the base and at the rear thereof, at each end (Figures 2 and 3), is a lug 21 on which the top 22 is pivoted by means of ears 23 and pivot pins 24 passing through the ears and the lugs. There are two ears for each lug so that each lug is located between a pair of ears and attached thereto by a pivot pin 24. Each end of the top is provided with pockets formed by pocket walls 25, which form partitions between the inner edges of the ears 23 (Figures 5 and 6).

In each pocket is a bearing housing 26 guided therein by means of a pin 27 extending through one of the walls 25 into a slot 28 provided in the bearing housing (Figure 4). At the upper end of the slot 28 is a stop 29, which prevents the bearing housing from passing down below a certain point in the pocket. The upper edge of each bearing housing is provided with a stud 30, which cooperates with a stud 31 located on the top for holding a spring 32. There are two of these springs, one at each end of the top, which tend to urge the bearing housings 26 downwardly. These springs are so formed that they have a compression ratio between the compression ratio of the harder rubber of the lower roll and the soft rubber of the upper roll.

Supported within each bearing housing is a bearing ring 33, and in this bearing ring is a sleeve 34 supported therein and spaced therefrom by means of anti-friction balls 35. The sleeve 34 is loosely and rotatably mounted upon one end of a shaft 36, which forms the shaft of the upper soft rubber roll 37. At the front of the base and on each end is a hook 38 (Figures 4 and 6). Each hook is adapted to fit between a pair of ears 39 forming part of the top and positioned with relation to the top similarly to ears 23 except that the present ears are at the front of the top.

Each pair of ears 39 carries therein a releasing and locking member in the form of a rotor 40. Each rotor intermediate its ends and on opposite sides is cut away to form flat cam members 41 for engagement with the hook 38. At one end of each rotor there is a head 42. These heads are connected by means of a yoke-like handle member 43, each end of which is attached to a head. Underneath the lower or harder roll the base is formed into two trough-like sections 44 and 45, spaced apart by means of a slot 46. The section 44 is at the front of the base, while the section 45 is at the rear thereof. The slot 46 is immediately beneath the lower roll.

These trough-like parts serve to receive and guide the water from the clothes being wrung (Figures 3 and 6). This water will pass through the slot 46 and is caught by means of a drainboard 47, which has at each end an upwardly extending flange 48 pivoted by means of screws 49 to a bracket 50 formed on the base.

When the top and the base are positioned for operating purposes they assume the position shown in Figure 4. In this figure the cam members 41 so engage the hooks 38 that the top is held in a fixed relation to the base. In the event that the hand of the operator should become entangled with the clothes or caught between the rolls the handle member 43 is pushed rearwardly until the cam members 41 pass beyond the ends of the hooks, thereby releasing the top from the base so that the top may easily move upwardly. The same results may be obtained by pulling the handle member forwardly until the parts 41 assume substantially a vertical position.

After the top has been released from the base, no adjustment of the springs and the rolls is necessary to a subsequent relocking of the top on the base. The upper or floating roller is so supported in the top that when the top is locked to the base it will take a co-operating position with relation to the lower roller without any adjustment.

Figure 7 shows how the rolls are deformed during the wringing of garments of different thicknesses. The numeral 51 represents a thick garment, which causes a considerable deformation in the soft rubber roll but a less deformation in the harder rubber roll, and does not interfere with a satisfactory wringing of a small piece of goods such as a handkerchief 52.

When the word "hard" is used to describe one of the rubber rolls it is intended to indicate that this rubber roll is harder than the soft rubber roll.

It will be understood that I desire to comprehend within my invention such modifications as come within the scope of my claims.

Having thus fully described my invention, what I claim as new and desire to secure by Letters Patent, is:

1. In a wringer, a base having therein a pair of pockets, said pockets being formed between the end walls of the base and a pair of U-shaped flanges spaced inwardly thereof, a sleeve extending through each flange, each sleeve having a bearing ring disposed therearound and balls interposed between the sleeve and said bearing ring, said bearing rings being supported in the bottoms of said pockets, a roll shaft supported in said sleeves and means in the pockets cooperating with said flanges to hold said bearing rings against longitudinal movement in said pockets.

2. In a wringer, a base having a pair of pockets therein, said pockets being formed between the end walls of the base and a pair of U-shaped flanges spaced inwardly thereof, a sleeve supported in the bottom of each U-shaped flange, a roll shaft supported in said sleeves, each of said sleeves having therearound a plurality of balls and a bearing ring adapted to be supported in the bottom of a pocket, and lug means in each of said pockets adapted to cooperate with one U-shaped flange to retain the bearing ring against longitudinal movement in said pocket.

3. In a wringer, a relatively hard rubber roll, a soft rubber roll cooperating with the hard rubber roll, and springs acting on at least one of said rolls to urge the rolls together, the amount of compression of the springs for a given pressure being between the amount of compression of the soft rubber roll and that of the hard rubber roll.

4. In a wringer, a relatively hard rubber roll, a soft rubber roll and springs tending to urge the rolls together, said springs for a given pressure having a compression amount between the amounts of compression of the rolls.

5. In a wringer, a lower roll, an upper roll, one of said rolls being of more resilient material than the other, and yielding means to urge the rolls together, said yielding means having an amount of compression under a given pressure intermediate the amount of compression of said rolls, whereby when relatively thin material is inserted between the rolls the more resilient roll alone will be compressed, when material of medium thickness is inserted between the rolls the more resilient roll and the yielding means will be compressed, and when relatively thick material is inserted between the rolls both rolls and the yielding means will be compressed.

6. In a wringer, a lower roll, an upper roll, one of said rolls being of more resilient material than the other, yielding members to urge the rolls together, said yielding members having an amount of compression under a given pressure intermediate the amounts of compression of said rolls.

7. In a wringer, the combination of a soft rubber roll, a harder rubber roll, and springs to urge the rolls toward each other, the amounts of compression for a given pressure of the soft rubber roll, the springs and the harder rubber roll being unequal and decreasing in the order of mention, whereby garments of different thicknesses may be successfully wrung at the same time.

ROBERT J. WATERWORTH.